United States Patent
Meirzon et al.

(10) Patent No.: US 9,112,579 B2
(45) Date of Patent: Aug. 18, 2015

(54) SWITCHING VSAT TRANSMITTER WITH SMART STAND-BY MODE

(75) Inventors: Tal Meirzon, Raanana (IL); Ido Nordenberg, Tel Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 1798 days.

(21) Appl. No.: 11/150,291

(22) Filed: Jun. 13, 2005

(65) Prior Publication Data

US 2005/0272365 A1 Dec. 8, 2005

Related U.S. Application Data

(63) Continuation-in-part of application No. 09/185,070, filed on Nov. 3, 1998, now Pat. No. 6,934,512.

(51) Int. Cl.
*H04H 20/74* (2008.01)
*H04B 7/185* (2006.01)
(Continued)

(52) U.S. Cl.
CPC ........ *H04B 7/18517* (2013.01); *H04B 7/18528* (2013.01); *H04W 52/0225* (2013.01); *H04W 52/0235* (2013.01)

(58) Field of Classification Search
CPC ............. H04B 1/1615; H04B 7/18517; H04B 7/18528; H04W 4/06; H04W 48/10; H04W 52/02; H04W 52/0209; H04W 52/0216; H04W 52/0222; H04W 52/0225; H04W 52/0274; H04W 52/028; H04W 60/04; H04W 68/00; H04W 68/025; H04W 72/12; H04W 84/022; H04W 63/0414; H04W 63/065; H04W 63/0869; H04W 12/06; H04L 9/3271; G06Q 20/383
USPC ............... 455/12.1, 13.4, 127, 321, 343, 412, 455/456, 427, 522, 517, 566, 572, 574, 455/3.02, 3.03, 127.1, 127.5, 343.2, 343.3, 455/343.4, 343.5, 414.3, 425, 435, 456.1, 455/411, 435.1, 436, 13.1, 13.2, 67.3, 98, 455/127.2, 127.3, 226, 343.1–343.6, 463; 348/729; 235/492; 370/229, 252, 311, 370/331, 338, 389, 345, 312, 316, 318, 332, 370/352, 365; 340/3.1, 5.61, 426.3, 572.1; 341/23, 31; 270/229, 252, 311, 312, 270/331, 338, 345, 352

See application file for complete search history.

(56) References Cited

U.S. PATENT DOCUMENTS 4,704,735 A 11/1987 Swapp et al.
5,128,938 A 7/1992 Borras
(Continued)

FOREIGN PATENT DOCUMENTS

EP 0426452 A2 5/1991
EP 1353447 A 10/2003
(Continued)

OTHER PUBLICATIONS

Khan, K.S.—"A single hop data/voice VSAT", Andrew Corporation, Richardson, TX 75081, 1990, pp. 23.6.1-23.6.4.
(Continued)

*Primary Examiner* — Yuwen Pan
*Assistant Examiner* — Paul P Tran
(74) *Attorney, Agent, or Firm* — Banner & Witcoff, Ltd.

(57) ABSTRACT

A VSAT terminal including an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface and in electrical connection with the microwave power amplifier and the microwave low noise amplifier for supplying power thereto, the controller being operative to provide a less-than-full electrical power supply to either of the amplifiers in the absence of a communication session and operative to provide a full electrical power supply to either of the amplifiers in the presence of a communication session. A smart stand by mode is employed in which the transmitter and receiver are turned off simultaneously to conserve power. The receiver turns on periodically to determine if it is to receive a call. After the VSAT turns on it will lock on the signal received from the hub and then wait for a special activation list message. The special activation list message is broadcast continuously and contains a list of all VSATs that are presently powered own but which should switch to active mode since they have an incoming call. After a VSAT receives the special activation list message, it checks whether its ID is in the list. If not, the VSAT returns to power down mode.

16 Claims, 5 Drawing Sheets

(51) Int. Cl.
*H04B 1/16* (2006.01)
*H04M 1/00* (2006.01)
*H04B 1/38* (2006.01)
*G08B 5/22* (2006.01)
*H04Q 1/30* (2006.01)
*G08C 17/00* (2006.01)
*H04H 20/71* (2008.01)
*H04J 3/00* (2006.01)
*H04B 7/212* (2006.01)
*H04B 1/00* (2006.01)
*H04B 3/46* (2006.01)
*H04B 17/00* (2006.01)
*H04Q 1/20* (2006.01)
*H04W 52/02* (2009.01)

(56) References Cited

U.S. PATENT DOCUMENTS

| | | |
|---|---|---|
| 5,233,645 A | 8/1993 | Choi et al. |
| 5,392,450 A * | 2/1995 | Nossen ............... 455/12.1 |
| 5,481,561 A | 1/1996 | Fang |
| 5,537,474 A | 7/1996 | Brown et al. |
| 5,541,929 A * | 7/1996 | Jokura ................ 370/337 |
| 5,577,100 A | 11/1996 | McGregor et al. |
| 5,594,951 A | 1/1997 | Bellin |
| 5,640,691 A | 6/1997 | Davis et al. |
| 5,668,803 A * | 9/1997 | Tymes et al. ........... 370/312 |
| 5,678,228 A * | 10/1997 | Soleimani et al. ...... 455/343.2 |
| 5,729,537 A | 3/1998 | Billstrom |
| 5,748,720 A | 5/1998 | Loder |
| 5,768,684 A | 6/1998 | Grubb et al. |
| 5,809,420 A | 9/1998 | Ichiyanagi et al. |
| 5,826,170 A | 10/1998 | Hirschfield et al. |
| 5,930,681 A * | 7/1999 | Snowden et al. ............ 455/13.4 |
| 5,978,366 A * | 11/1999 | Massingill et al. ............ 370/337 |
| 5,991,635 A * | 11/1999 | Dent et al. ................... 455/517 |
| 6,064,857 A | 5/2000 | Wiedeman et al. |
| 6,070,067 A | 5/2000 | Nguyen et al. |
| 6,198,823 B1 | 3/2001 | Mills |
| 6,223,047 B1 * | 4/2001 | Ericsson ..................... 455/517 |
| 6,233,429 B1 * | 5/2001 | Soffer et al. ................ 455/12.1 |
| 6,311,048 B1 | 10/2001 | Loke |
| 6,311,054 B1 | 10/2001 | Korpela |
| 6,393,269 B1 | 5/2002 | Hartmaier et al. |
| 6,415,142 B1 | 7/2002 | Martineau |
| 6,556,807 B1 | 4/2003 | Horie et al. |
| 7,023,832 B2 * | 4/2006 | Ragan et al. ................ 370/345 |
| 2003/0100260 A1 * | 5/2003 | Meirzon et al. ............. 455/13.4 |
| 2003/0236077 A1 * | 12/2003 | Sivard ....................... 455/127.1 |
| 2005/0254444 A1 * | 11/2005 | Meier et al. .................. 370/312 |
| 2006/0193315 A1 * | 8/2006 | Sinivaara et al. ............. 370/389 |

FOREIGN PATENT DOCUMENTS

| | | |
|---|---|---|
| GB | 2382500 A | 5/2003 |
| WO | 0027048 A | 5/2000 |
| WO | 0027142 A | 5/2000 |

OTHER PUBLICATIONS

European Search Report for Application No. EP06253070.4 mailed Dec. 23, 2008, 6 pages.

* cited by examiner

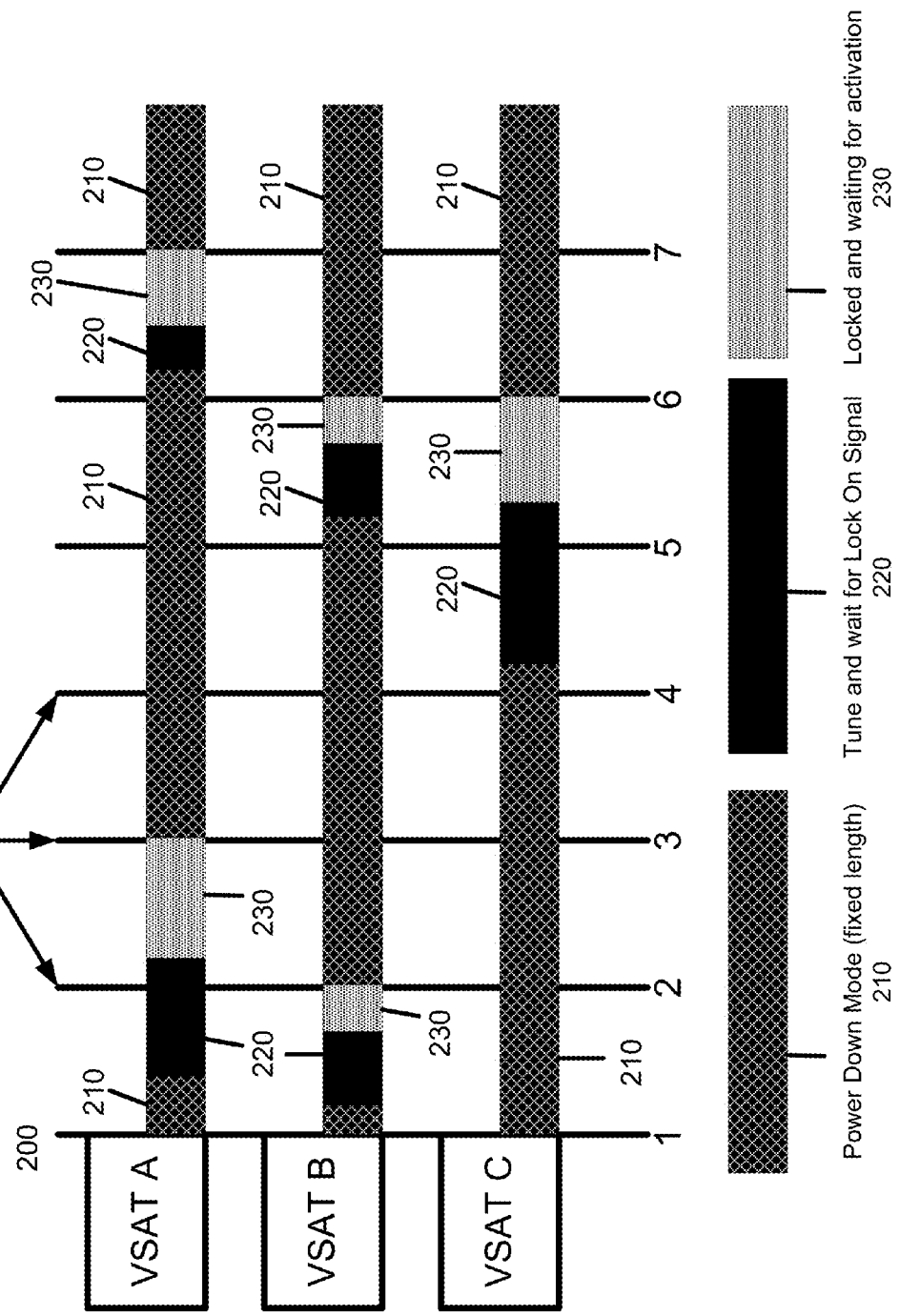

SWITCHING VSAT TRANSMITTER WITH SMART STAND-BY MODE

FIELD OF THE INVENTION

The present invention relates to telecommunications in general, and in particular to improved VSAT satellite telecommunications methods and apparatus.

BACKGROUND OF THE INVENTION

Primary design considerations for a VSAT satellite telecommunication network include the cost of the remote terminal (VSAT) as a function of its complexity, power consumption, and dish size, the bandwidth efficiency as determined by the access scheme, and the cost of the network switch or "hub." The type and availability of a power source may have a significant impact on the cost of the VSAT, particularly in rural or remote regions where power supply is relatively scarce and expensive.

SUMMARY OF THE INVENTION

The present invention seeks to provide improved VSAT satellite telecommunications methods and apparatus having reduced overall power consumption. A typical low cost VSAT terminal comprises simple power and low noise amplifiers. These amplifiers are the major power consuming elements, and often account for more than 50% of total VSAT power consumption. Power switching methods and apparatus is provided for use with such simple low cost amplifiers that are not generally equipped with controllers.

There is thus provided in accordance with a preferred embodiment of the present invention a VSAT terminal including an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface and in electrical connection with the microwave power amplifier and the microwave low noise amplifier for supplying power thereto, the controller being operative to provide a less-than-full electrical power supply to either of the amplifiers in the absence of a communication session and operative to provide a full electrical power supply to either of the amplifiers in the presence of a communication session.

Further in accordance with a preferred embodiment of the present invention the controller is responsive to operation of the user VSAT interface for providing electrical power to the microwave power amplifier.

Still further in accordance with a preferred embodiment of the present invention the controller is responsive to operation of the user VSAT interface for providing electrical power to the microwave low noise amplifier.

Additionally, in accordance with a preferred embodiment of the present invention the controller provides less-than-full power supply to the microwave low noise amplifier and the microwave power amplifier in the absence of a communication session and the controller is responsive to operation of the user VSAT interface for providing a full electrical power supply to the microwave low noise amplifier and the microwave power amplifier.

Moreover, in accordance with a preferred embodiment of the present invention the controller provides a less-than-full power supply to the microwave power amplifier and a full power supply to the microwave low noise amplifier in the absence of a communication session and the controller is responsive to receipt of an incoming transmission via the microwave low noise amplifier for providing a full electrical power supply to the microwave low noise amplifier and the microwave power amplifier.

Still further in accordance with a preferred embodiment of the present invention the controller is operative to provide less-than-full electrical power supply to either of the amplifiers after a predetermined period of inactivity of the user VSAT interface.

Additionally, in accordance with a preferred embodiment of the present invention the controller is operative to provide less-than-full electrical power supply to either of the amplifiers after a predetermined period of inactivity of the microwave low noise amplifier.

Moreover, in accordance with a preferred embodiment of the present invention the controller operates in accordance with a preferred algorithm for providing electrical power to the microwave power amplifier.

There is also provided, in accordance with a preferred embodiment of the present invention a VSAT telecommunication network including at least one satellite, and a plurality of VSAT terminals in communication with the satellite, the at least one of the VSAT terminals includes an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface and in electrical connection with the microwave power amplifier and the microwave low noise amplifier for supplying power thereto, the controller being operative to provide a less-than-full electrical power supply to either of the amplifiers in the absence of a communication session and operative to provide a full electrical power supply to either of the amplifiers in the presence of a communication session.

There is additionally provided, in accordance with a preferred embodiment of the present invention a method for managing power consumption in a VSAT terminal having an antenna, a microwave power amplifier, a microwave low noise amplifier, a transmitter coupled via the microwave low noise amplifier to the antenna, a receiver coupled via the microwave low noise amplifier to the antenna, a user VSAT interface, and a controller in communication with the user VSAT interface, the microwave low noise amplifier and the microwave power amplifier, the method including providing a less-than-full electrical power supply to either of the amplifiers in the absence of a communication session, and providing a full electrical power supply to either of the amplifiers in the presence of a communication session.

Further in accordance with a preferred embodiment of the present invention the providing a less-than-full electrical power supply step includes providing a less-than-full power supply to the microwave low noise amplifier and the microwave power amplifier in the absence of a communication session and the providing a full electrical power supply step includes providing a full electrical power supply to the microwave low noise amplifier and the microwave power amplifier in response to operation of the user VSAT interface.

Still further in accordance with a preferred embodiment of the present invention the method further includes providing a full power supply to the microwave power amplifier in the absence of a communication session, the providing of less-than-full power supply step includes providing a less-than-full power supply to the microwave power amplifier and the providing a full electrical power supply step includes providing a full electrical power supply to the microwave power amplifier and the microwave low noise amplifier in response to operation of the user VSAT interface.

Additionally in accordance with a preferred embodiment of the present invention the method further includes providing a full power supply to the microwave power amplifier in the absence of a communication session, the providing a less-than-full electrical power supply step includes providing a less-than-full power supply to the microwave power amplifier and the providing full electrical power supply step includes providing a full electrical power supply to the microwave low noise amplifier and the microwave power amplifier in response to receipt of an incoming transmission via the microwave low noise amplifier.

Moreover in accordance with a preferred embodiment of the present invention the providing a less-than-full electrical power supply step includes providing a less-than-full power supply to either of the amplifiers after a predetermined period of inactivity of the user VSAT interface Further in accordance with a preferred embodiment of the present invention the providing a less-than-full electrical power supply step includes providing a less-than-full power supply to either of the amplifiers after a predetermined period of inactivity of the microwave low noise amplifier.

Additionally, according to another embodiment of the present invention a smart stand by mode is employed in the VSAT in which the transmitter and receiver are turned off simultaneously to conserve power. The transmitter turns on when a user switches the VSAT to active mode. The receiver turns on periodically to determine if it is to receive a call. The timing of the periodic turning on of the receiver is not synchronized with a network manager. After the VSAT turns on it will lock on the signal received from the hub and then wait for a special activation list message. The special activation list message is broadcast continuously and contains a list of all VSATs that are presently powered own but which should switch to active mode since they have an incoming call. After a VSAT receives the special activation list message, it checks whether its ID is in the list. If not, then no call is coming and the VSAT returns to power down mode. If its ID is in the list, the VSAT switches to active mode. The time that the VSAT is on varies since the lock time of the receiver varies and the time it takes to receive the activation list from the hub is unknown.

BRIEF DESCRIPTION OF THE DRAWINGS

The present invention will be understood and appreciated from the following detailed description, taken in conjunction with the drawings in which:

FIG. 5 is the graph illustrating the functional states of three VSATs over a period of time.

DETAILED DESCRIPTION OF THE INVENTION

Figure 1:
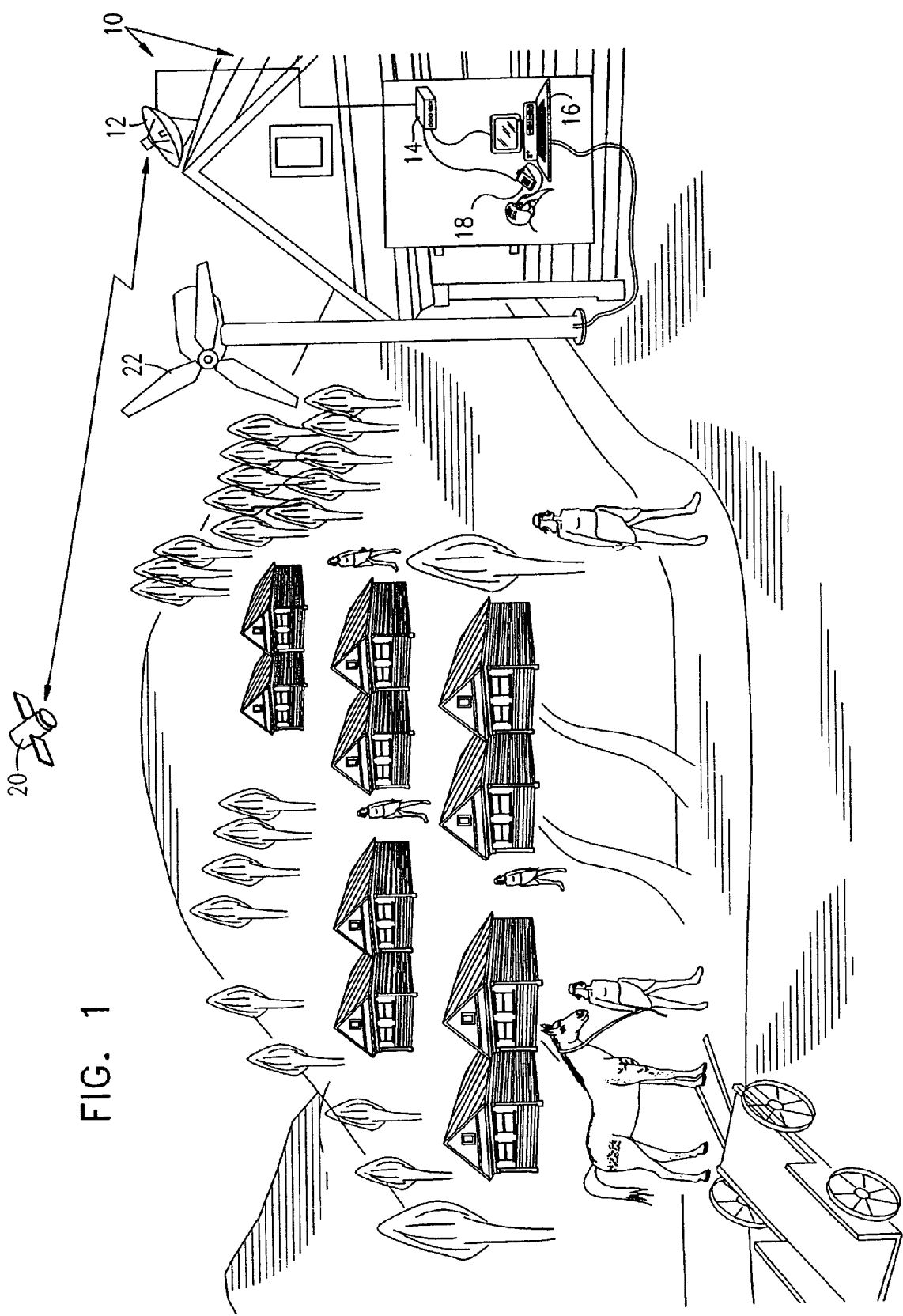
FIG. 1 is a simplified pictorial illustration of a VSAT satellite telecommunications network system constructed an operated in accordance with a preferred embodiment of the present invention.

Reference is now made to FIG. 1 which is a simplified pictorial illustration of a VSAT satellite telecommunications network system constructed an operated in accordance with a preferred embodiment of the present invention. In the system of FIG. 1 one or more VSATs 10, typically including an antenna 12 connected to a control unit 14, also referred to as an "indoor unit" or IDU, are provided, for communication with satellite 20. VSAT 10 is typically connected to one or more user interfaces such as computer 16 and a voice communicator 18. A power source 22 is provided to power VSAT 10. In rural or remote areas, such as the mountainous region shown in FIG. 1, any power source 22 may be an alternative power source such as a windmill or solar panels, although any known power source may be provided.

Figure 2:
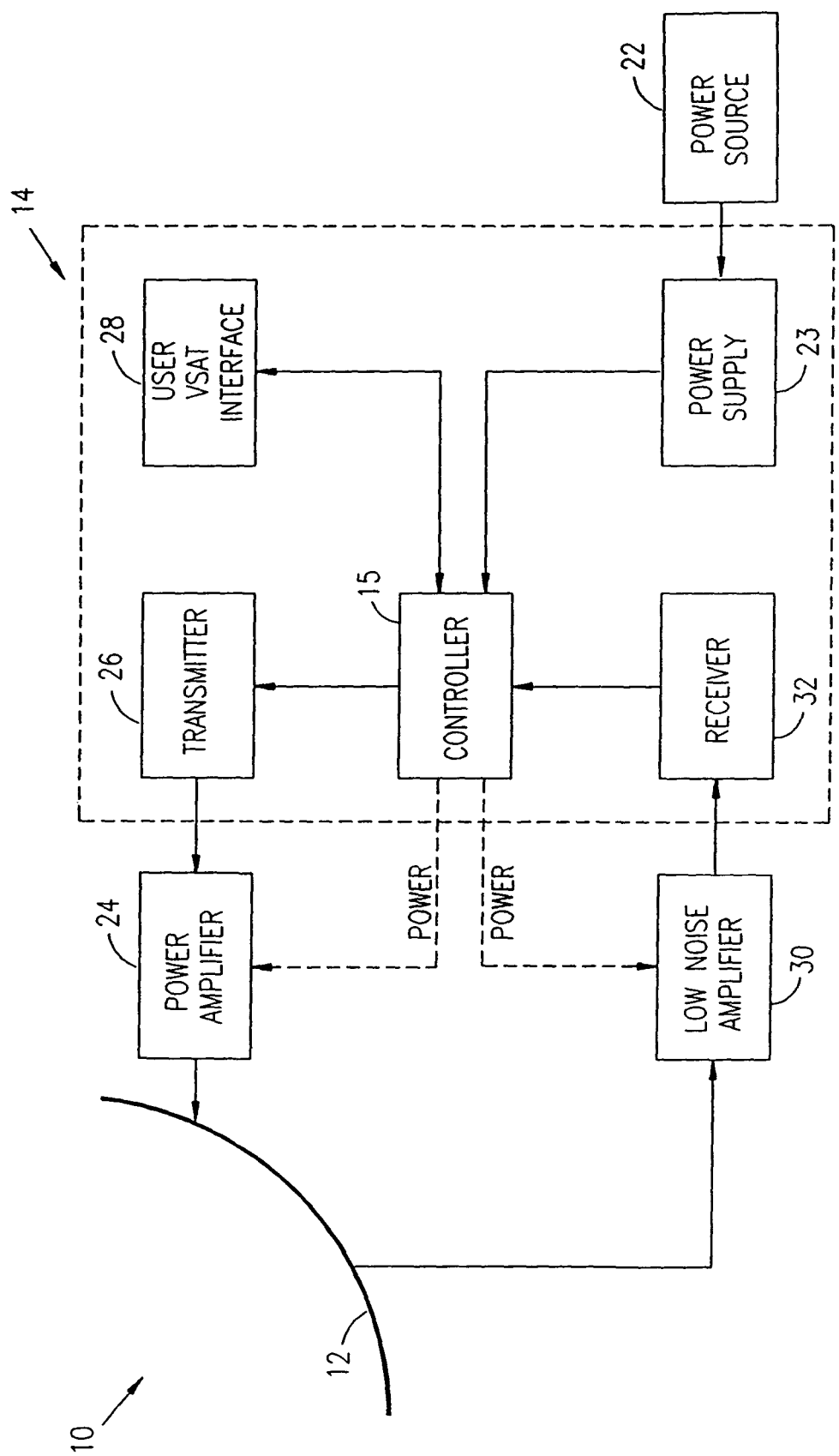
FIG. 2 is a simplified block diagram of the VSAT terminal of FIG. 1.

Reference is now made to FIG. 2, which is a simplified block diagram of the VSAT terminal 10 of FIG. 1. Terminal 10 typically comprises a power amplifier 24 connected to antenna 12, such as any known microwave power amplifier, a transmitter 26, and a user VSAT interface 28, typically connectable to computer 16 and voice communicator 18. Terminal 10 also typically comprises a low noise amplifier 30 connected to antenna 12, such as any known microwave low noise amplifier, and a receiver 32. A controller 15, typically being connected to power source 22 via a power supply 23, directs full power or less-than-full power to power amplifier 24 and/or low noise amplifier 30 as described hereinbelow. Transmitter 26, user VSAT interface 28, receiver 32, controller 15, and power supply 23 typically collectively form control unit 14.

Figure 3:
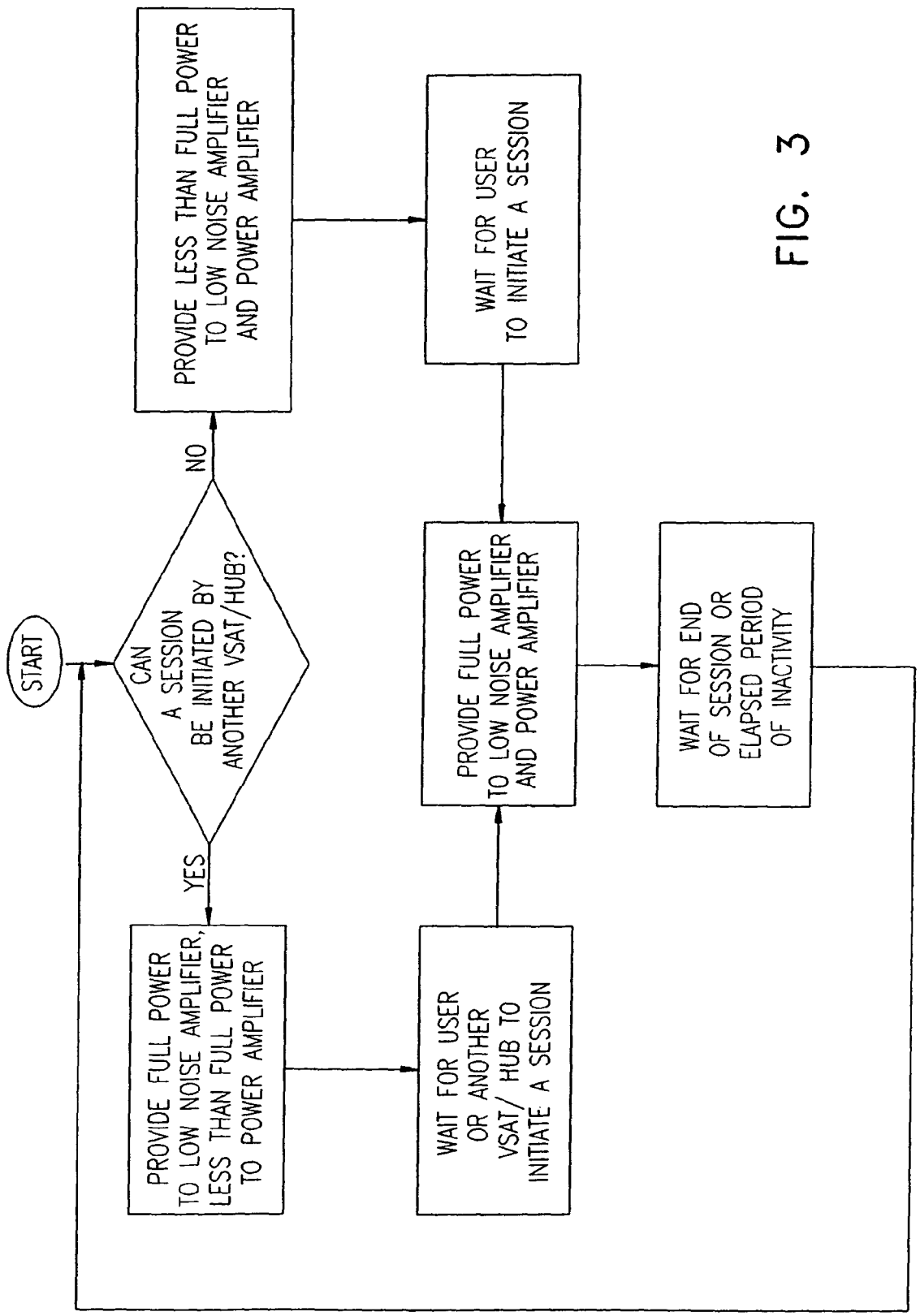
FIG. 3 is a simplified flow chart of a method of using VSAT 10 operative in accordance with a preferred embodiment of the present invention.

Typical operation of VSAT 10 of FIG. 2 is now described with additional reference to FIG. 3, which is a simplified flow chart of a method of using VSAT 10 operative in accordance with a preferred embodiment of the present invention. The method of FIG. 3 provides for two preferred modes of operation of VSAT 10. In one mode of operation a communication session may be initiated by either a user via user VSAT interface 28 or by another VSAT or hub wishing to communicate with VSAT 10. In this mode controller 14 provides full power to low noise amplifier 30 and less-than-full power to power amplifier 24. Less-than-full power may be any power level less than that which is required for normal operation of low noise amplifier 30 and power amplifier 24, including no power at all. Controller 14 then waits until an incoming transmission is received by VSAT 10 or until a user initiates an outgoing transmission. Controller 14 then continues to provide full power to low noise amplifier 30, as well as to power amplifier 24.

In another mode of operation a communication session may only be initiated by a user via user VSAT interface 28. In this mode controller 14 provides less-than-full power to low noise amplifier 30 and power amplifier 24. Controller 14 then waits until the user initiates an outgoing transmission. Controller 14 then provides full power to both low noise amplifier 30 and power amplifier 24.

Whichever operational mode is used, once a session has either been expressly ended or a predetermined period of time has elapsed, low noise amplifier 30 and power amplifier 24 preferably revert to their pre-session power modes as indicated above.

It is appreciated that the method of FIG. 3 may be partly or wholly implemented as a computer software algorithm, as preprogrammed computer hardware, or as any suitable combination using techniques well known in the art.

Figure 4:
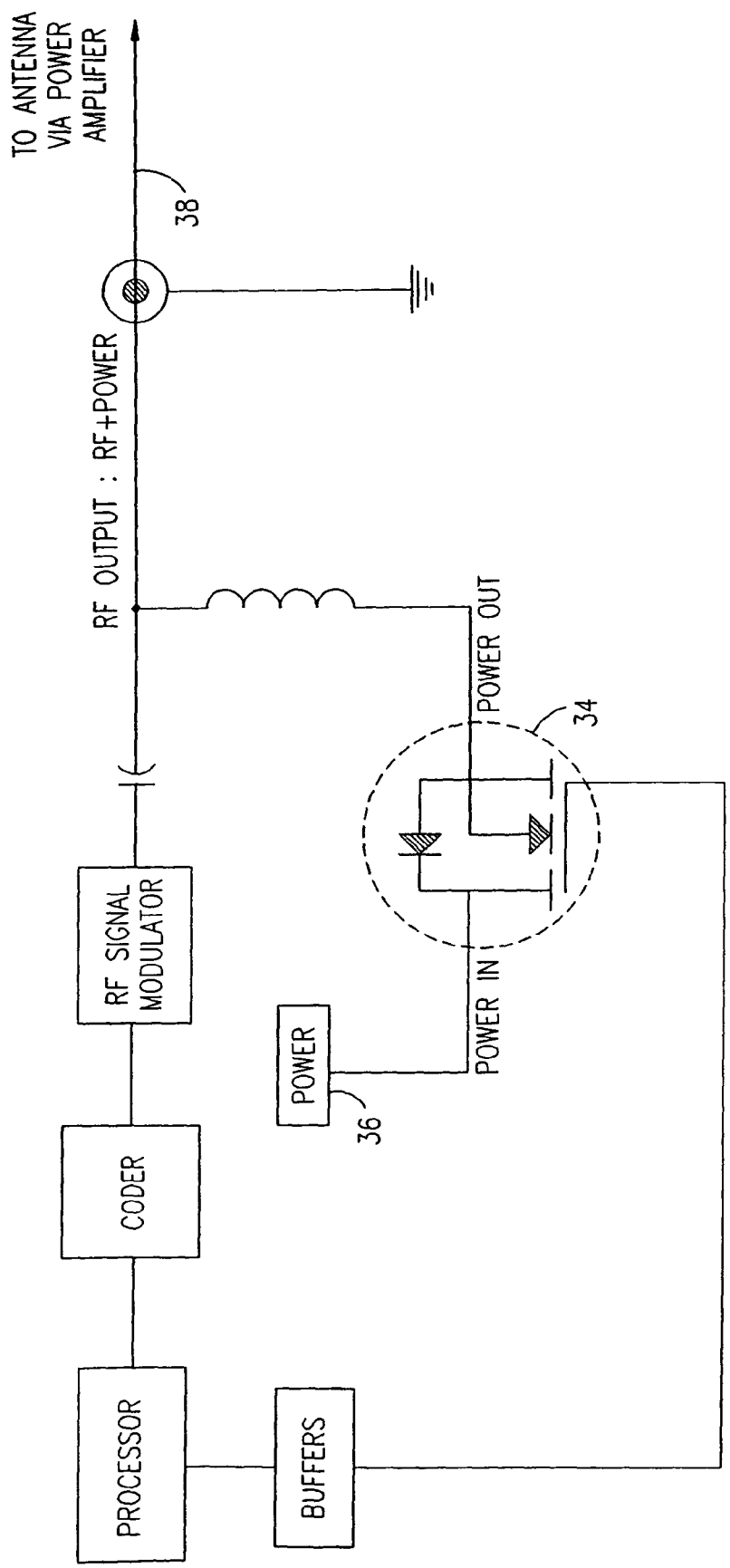
FIG. 4 is a simplified block diagram of electronic elements of controller 14 of FIG. 2.

Reference is now made to FIG. 4, which is a simplified block diagram of transmission and power control elements typically included in controller 14 of FIG. 2. In addition to transmission circuitry well known for VSAT control units, a power control switch 34 is provided, typically coupled to a power source 36 which may be an AC or DC power source. In this manner power may be provided together with an RF transmission via an output 38 to the antenna transmitter and power amplifier (not shown), or cut off when there is no RF transmission to be sent.

A telephone VSAT includes a transmitter, a receiver and a telephone interface. As discussed previously, one object of the present invention is to reduce power consumption as much as possible without sacrificing the functionality of the VSAT. Usually the user can either initiate calls from the VSAT or receive calls that originate from the telephone network. While it is relatively easy to turn off the transmitter when it is not required, controlling the power consumption by the receiver is more complicated.

When the receiver is powered up and operating, when a call is received, the VSAT will receive a command from the hub telling it to turn on the transmitter and begin the call process. During normal operation a VSAT may only be active for a small amount of time, e.g., 1-2 hours/day. The remainder of the time the VSAT is idle. In conventional VSAT, in order for the receiver to be able to receive incoming calls, the receiver remains turned on. In the present invention, the receiver is turned off a significant portion of the idle time thereby reducing the power consumption.

In a smart stand by mode of the present invention, the transmitter and receiver in the VSAT are simultaneously turned off to conserve power. The transmitter turns on when a user switches the VSAT to active mode, e.g., when the user picks up the phone or initiates a data application. The receiver turns on periodically to determine if the VSAT is to receive a call. The timing of the periodic turning on of the receiver is not synchronized with a network manager, which reduces the complexity of the receiver. After the VSAT turns on it will lock on the signal received from the hub and then wait for a special activation list message. The amount of time required for the VSAT to lock on to the signal from the hub is unknown. The special activation list message is broadcast continuously to all VSATs, and contains a list of all VSATs that are presently powered down but which should switch to active mode since they have an incoming call. After a VSAT receives the special activation list message, it checks whether its ID is in the list. If not, then no call is coming and the VSAT returns to power down mode. If its ID is in the list, the VSAT switches to active mode. The time that the VSAT is on varies since the lock time of the receiver varies and the time it takes to receive the activation list from the hub is unknown.

The total time that the receiver of the VSAT is powered up varies due to the fact that the time it takes the receiver to lock varies and the time required to receive the special activation list message is unknown. Referring to FIG. 5, the functional states of three VSATs A, B, and C are shown over time. During the period of time illustrated in FIG. 5, multiple periodic special activation list messages 200 are sent. FIG. 5 is not drawn to scale.

As time passes the VSATs A, B and C have three states: power down mode 210, tune and wait for a lock on signal mode 220, and a locked and waiting for activation mode 230. VSATs A, B and C are all in power down mode 210 at the time of the first periodic special activation list message 200. At the time of the second periodic special activation list message 200, VSAT A is in tune and wait for a lock on signal mode 220, VSAT B has already passed through tune and wait for a lock on signal mode 220, and is in locked and waiting for activation mode 230. VSAT C is still in power down mode 210.

At the time of the third periodic special activation list message 200, VSAT A is in locked and waiting for activation mode 230, and VSATs B and C are in power down mode 210. At the fourth periodic special activation list message 200, VSATs A, B and C are in power down mode 210. At the fifth periodic special activation list message 200, the VSAT C is in tune and wait for a lock on signal mode 220, and VSATs A and B are in power down mode 210.

At the sixth periodic special activation list message 200, VSAT A is still in power down mode 210, VSAT B has already passed through tune and wait for a lock on signal mode 220, and is in locked and waiting for activation mode 230, and VSAT C is also in locked and waiting for activation mode 230. At the seventh periodic special activation list message 200, the VSAT A has passed through tune and wait for a lock on signal mode 220, and is in locked and waiting for activation mode 230, and VSATs B and C are in power down mode 210.

When none of the VSATs A, B or C receives an activation command, i.e., the VSATs ID is not on the activation list in the special message 200, the VSATs A, B and C all go back to power down mode 210. The time each of the VSATs is in the tune and wait for a lock on signal mode 220 and the locked and waiting for activation mode 230 varies and is more or less random. The time is took VSAT A to tune and wait for the lock on signal in mode 220 varies. Similarly the VSAT C took considerable relative time in the tune and wait for a lock on signal mode 220 at the fifth periodic special activation list message 200.

Similarly the time each of the VSATs A, B and C remains in the locked and waiting for activation mode 230 varies. One implementation could transmit special activation list messages every 250 msec. The tune and lock time could average 100 msec., and the power down time could be fixed at 2 seconds. In such a configuration, the average powered on time is the sum of the average lock and an average of 125 msec to receive the special activation list message 200, for a total of 225 msec. The average off time is 2 seconds. Thus, the power on to power off ratio is 0.11, which translates to an 89% power savings.

Instead of the receiver being in a continuous powered state the receiver can be powered down the majority of the time (89% of the time in the foregoing example) and only needs to be powered for the short intervals required to tune and lock on the activation list message signal and to wait for activation. When the ID of a given VSAT is not on the activation list, the VSAT returns to powered down mode.

If the ID of a VSAT is on the activation list in the message 200, the receiver in the VSAT powers up to receive the message and then returns to powered down mode.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable combination.

It will be appreciated by persons skilled in the art that the present invention is not limited to what has been particularly shown and described hereinabove. Rather, the scope of the present invention is only defined by the claims which follow.

What is claimed is:

1. A very small aperture terminal (VSAT) for communicating to a hub, comprising:
   a control unit having a receiver, the control unit configured to:
   intermittently tune the receiver to and wait for a lock on a signal from the hub;
   wait for an activation message when the receiver is locked on the signal from the hub, wherein the activation message is broadcasted continuously to all VSATs and includes a list of a plurality of VSAT IDs, wherein the list is configured to specify VSATs that are to switch to an active mode;

determine whether to power down at least the receiver based on whether a VSAT ID of the VSAT is included in the list; and power down at least the receiver in response to determining that the VSAT ID is not included in the list.

2. The VSAT as recited in claim 1, further comprising a transmitter.

3. The VSAT as recited in claim 1, wherein at least one of a first time the VSAT waits for the lock on the signal from the hub and a second time the VSAT waits for the activation message is an unfixed period of time.

4. The VSAT as recited in claim 2, wherein the control unit is further configured to, in response to determining that the VSAT ID is included in the list:

power up the receiver or, if already powered up, keep the receiver powered up; and power up the transmitter.

5. The VSAT as recited in claim 2, wherein the control unit is further configured to keep the receiver and the transmitter powered down a majority of the time.

6. The VSAT as recited in claim 1, wherein the list identifies which VSATs have an incoming message.

7. The VSAT as recited in claim 1, wherein the receiver returns to a powered up mode upon determining that the activation message includes the VSAT ID of the VSAT.

8. The VSAT of claim 1, wherein determining whether to power down the VSAT is based solely on the list.

9. A method of controlling a power supply to a very small aperture terminal (VSAT) communicating with a hub, the VSAT including a transmitter and a receiver, the method comprising:

intermittently tuning to and waiting for a lock in the receiver on a signal from the hub;

waiting for an activation message when the receiver is locked on the signal from the hub, wherein the activation message is broadcast continuously to all VSATs and includes a list of a plurality of VSAT IDs, wherein the list is configured to specify VSATs that are to switch to an active mode;

determining whether to power down at least the receiver and the transmitter based on whether a VSAT ID of the VSAT is included in the list; and in response to determining that the VSAT ID of the VSAT is not included in the list, powering down at least the receiver.

10. The method of claim 9, wherein at least one of a first time the VSAT waits for the lock on the signal from the hub and a second time the VSAT waits for the activation message is an unfixed period of time.

11. The method of claim 9, further comprising, in response to determining that the VSAT ID is included in the list:

powering up the receiver or, if the receiver is already powered up, keep the receiver powered up; and powering up the transmitter.

12. The method of claim 9, further comprising keeping the receiver and the transmitter powered down a majority of the time.

13. The method of claim 9, wherein the list identifies which VSATs have an incoming message.

14. A system for controlling a power supply to a very small aperture terminal (VSAT), comprising:

a VSAT; and a hub, wherein the VSAT and the hub communicate with one another;

wherein the hub transmits an activation message that is broadcasted continuously to all VSATs and includes a list specifying IDs of VSATs that have incoming communications, wherein the VSAT comprises:

a transmitter; and a receiver configured to intermittently tune to and wait for a lock on a signal from the hub, and configured to wait for the activation message when the receiver is locked on the signal from the hub, and wherein the VSAT is configured to power down at least the receiver and the transmitter when the activation message does not contain an ID of the VSAT.

15. The system as recited in claim 14, wherein the activation message is transmitted periodically to one of the VSATs.

16. The system as recited in claim 14, wherein the VSAT is further configured to, when the list includes the ID of the VSAT:

power up the receiver or, if the receiver is already powered up, keep the receiver powered up; and power up the transmitter.

* * * * *